United States Patent
Heichel

[11] 3,902,038
[45] Aug. 26, 1975

[54] DISPLACED ELECTRODE PROCESS FOR WELDING

[75] Inventor: Lawrence J. Heichel, West Mifflin, Pa.

[73] Assignee: The United States of America as represented by the United States Energy Research and Development Administration, Washington, D.C.

[22] Filed: July 22, 1974

[21] Appl. No.: 490,446

Related U.S. Application Data

[63] Continuation of Ser. No. 395,218, Sept. 7, 1973, abandoned.

[52] U.S. Cl. ................................ 219/137; 219/61
[51] Int. Cl.² ........................................ B23K 31/06
[58] Field of Search ................ 219/137, 59, 60, 61

[56] References Cited
UNITED STATES PATENTS

| | | | |
|---|---|---|---|
| 2,787,699 | 4/1957 | Jessen ........................... | 219/137 R |
| 3,068,343 | 12/1962 | Rössner......................... | 219/60 R |
| 3,183,066 | 5/1965 | Lessmann et al. .............. | 219/137 R |
| 3,188,446 | 6/1965 | Ray et al......................... | 219/137 R |
| 3,592,997 | 7/1971 | Durie .............................. | 219/137 R |
| 3,725,635 | 4/1973 | Fink et al........................ | 219/137 R |

*Primary Examiner*—J. V. Truhe
*Assistant Examiner*—Clifford C. Shaw
*Attorney, Agent, or Firm*—Dean E. Carlson; Arthur A. Churm; Walter L. Rees

[57] ABSTRACT

In butt-welding heat is normally applied at the joint between the two pieces which are butt-welded together. When one of the pieces is a relatively heavy mass and the other piece a relatively small mass such as a thin-wall tube, the application of heat at the joint results in overheating the tube which causes thinning of the tube walls and porosity in the tube material. This is eliminated by displacing the welding electrode away from the seam toward the heavier mass so that heat is applied to the heavy mass and not at the butt seam.

4 Claims, 4 Drawing Figures

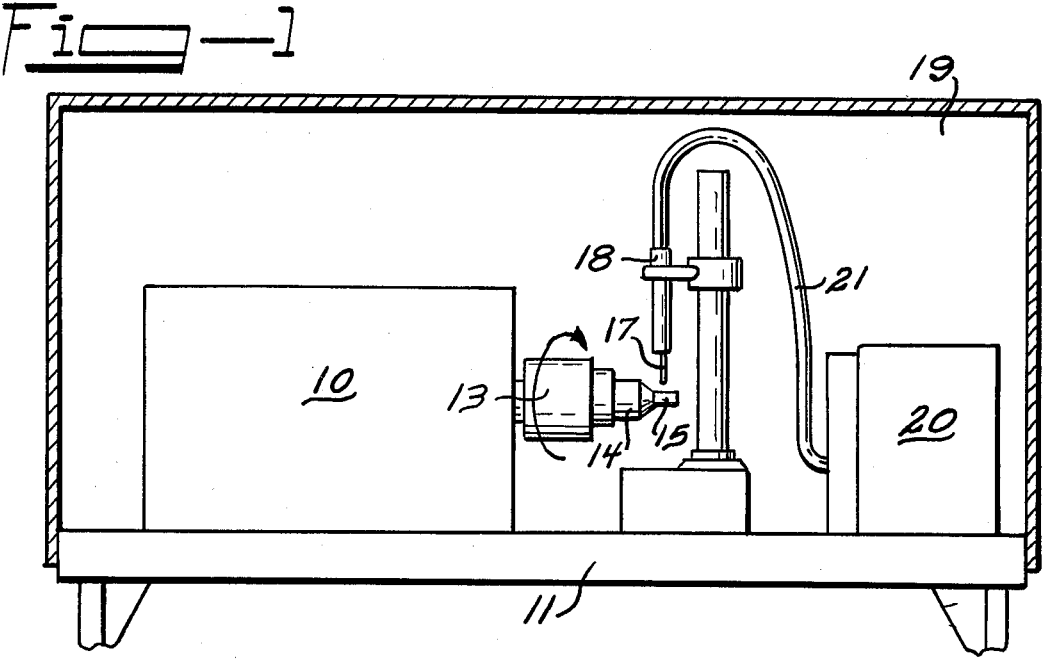
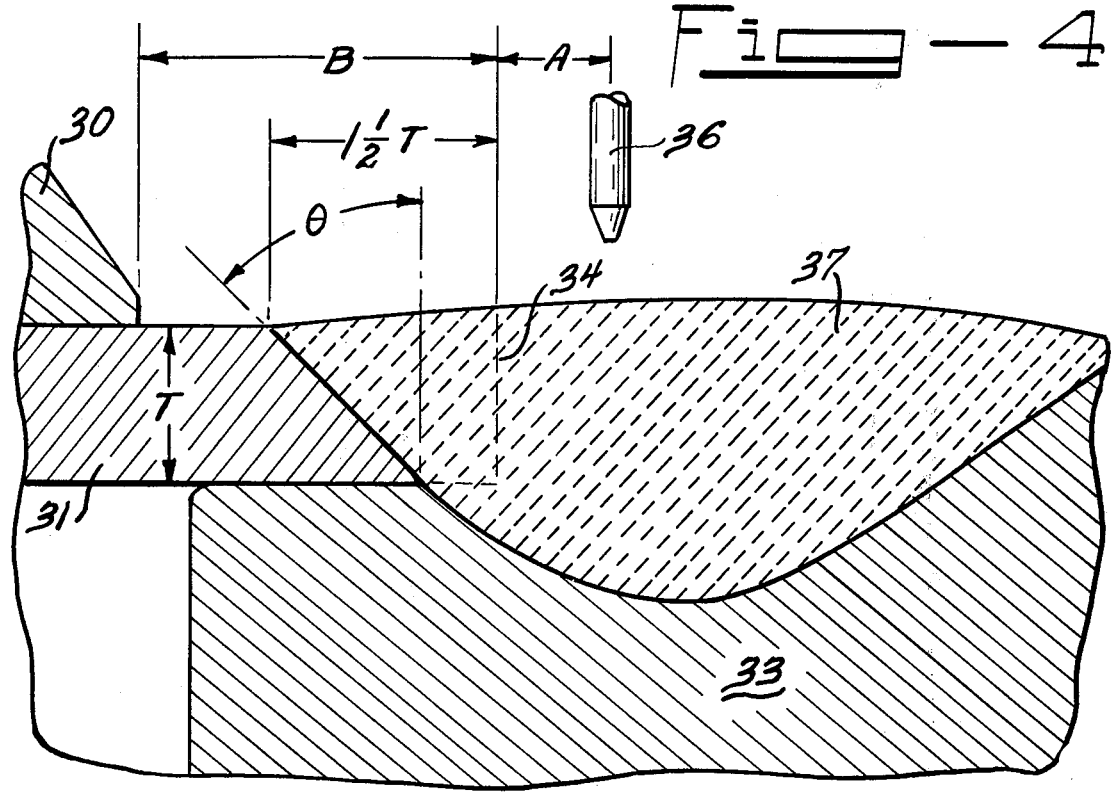

DISPLACED ELECTRODE PROCESS FOR WELDING

CONTRACTUAL ORIGIN OF THE INVENTION

The invention described herein was made in the course of, or under, a contract with the UNITED STATES ATOMIC ENERGY COMMISSION.

This is a continuation, of application Ser. No. 395,218, filed Sept. 7, 1973.

BACKGROUND OF THE INVENTION

The welding of a very small mass to a relatively large mass has always been a problem because of the different heat capacities and heat-transfer characteristics of the pieces being welded. This has particularly been a problem in the fabrication of fuel rod assemblies for nuclear reactors where the end closures have suffered from weld defects such as porosity and clad thinning. Many techniques have been tried to improve the quality of the welds, such as using special weld joint fits and configurations, special surface preparations and special cleaning procedures. The welding current and welding speeds have been varied and special end plug inserts have been used with bleed grooving, bleed holes or hollow inserts. None of these techniques has resulted in a welding process that is capable of consistently producing good welds.

It is therefore an object of this invention to provide an improved method of making butt welds between small-mass and large-mass pieces.

Another object of this invention is to provide a welding process which can be used to weld end plugs to fuel rod cladding with consistently good welds.

In practicing this invention, a supporting structure is provided for supporting the tube and end block in a fixed position in relation to a welding electrode. The supporting structure includes a chill block which completely surrounds and is in close contact with the tube to provide a low-resistance thermal path from the tube to the chill block. The tube and end block are positioned so that the welding electrode is displaced from the seam between the tube and end block toward the end block. The displacement of the welding electrode is from ¾ to 2¼ times the thickness of the tube, with the chill block being positioned from 1.7 to 2.9 times the thickness of the tube from the seam to limit the spread of the top surface of the weld nugget. The chill block and the electrode are positioned in relation to the seam so that the top surface of the weld nugget extends down the tube approximately 1½ times the tube thickness. The supporting structure also provides means for rotating the tube and end block so that the entire circumferential seam is welded.

BRIEF DESCRIPTION OF THE DRAWINGS

The invention is illustrated in the drawings, of which:

FIG. 1 is a view showing the welding setup including the supporting structure and welding electrode;

FIG. 4 is an enlarged view of the seam and welding nugget produced as a result of the novel electrode position.

DETAILED DESCRIPTION OF THE INVENTION

Figure 2:
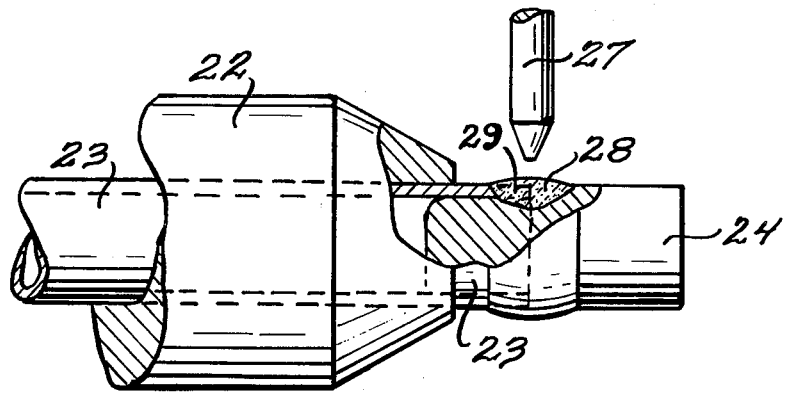
FIG. 2 is an enlarged view showing the chill block welding seam and showing the prior art position of the electrode.

Referring to FIG. 1, there is shown a welding apparatus for carrying out the welding procedure of this invention. A supporting structure 10 is mounted on a table 11. The supporting structure 10 includes a projecting chuck 13 which clamps and holds the chill block 14 and the fuel rod structure 15. The supporting structure 10 includes means for rotating chuck 13 through 360° or more in order that the entire circumferential seam between the end block and the tube can be welded.

The welding structure further includes a tungsten electrode 17 mounted in a holder 18. The electrode 17 is connected to a welding current supply 20 by means of cable 21. The entire structure shown in FIG. 1 is a conventional type of welding structure and any welding structure which provides means for fixing the position of the welding electrode with respect to the seam, as later described in this specification, could be used. In this example, the tube-end plug structure is shown in the horizontal position. However, welding could also be accomplished with the tube-end plug structure in a vertical position. The entire structure shown in FIG. 1 is enclosed within a sealed enclosure 19. During operation, the sealed enclosure is filled with an inert gas so that the welding process carried out is the process known as TIG welding.

Referring to FIG. 2, there is shown a prior art apparatus for welding the end plug 24 to the tube end. In FIG. 2, only the chill block 22, electrode 27, tube 23 and end plug 24 are shown. End plug 24 is fitted into tube 23 and this assembly is gripped in a welding lathe by means of the copper chill block 22. This assembly is positioned so that the electrode 27 is directly over the tube end plug seam 28 and the assembly is rotated. The rotational speed and the welding current are adjusted to insure 100 percent clad penetration at the weld joint. The weld nugget 29 is approximately symmetrical about the seam and ½ of the weld nugget directly affects the tube wall. Radiographic examination of many of these prior art welds indicates that the porosity favors the tube side of the weld and clad thinning is common to the tube side of the weld.

Figure 3:
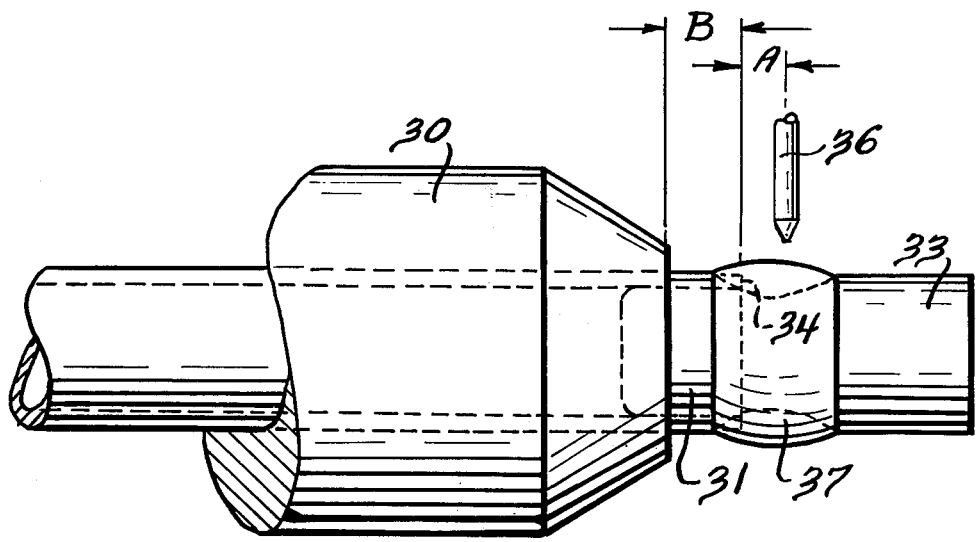
FIG. 3 is a view similar to that of FIG. 2 showing the placement of the electrode as defined in this invention.

Referring to FIGS. 3 and 4, there is shown the improved structure for carrying out the technique of this invention. In these figures, the electrode 36 is displaced away from the tube end plug seam 34 toward the end plug a distance A. The weld nugget resulting from this displacement is asymmetrical about the electrode axis. This reduces the heat-affected portion of the tubing 31 to a minimum. Chill block 30 is displaced from seam 34 away from the end plug a distance B. By displacing electrode 36 away from seam 34, chill block 30 can be placed much closer to the seam to further reduce the adverse effects of the weld on the tube.

Distance A is approximately ¾ to 2¼ of the thickness T of the tube. Distance B is from 1.7 to 2.9 times the thickness of the tube. With the electrode and chill block positioned within these limits, the welding current and the speed of rotation of the tube and plug combination are adjusted so that the weld nugget extends down the tube away from the seam no more than 1½ times the wall thickness T of tube 31. Since the initial angle θ that the weld nugget makes in the tube wall is approximately 45°, the weld nugget 37 achieves 100 percent clad penetration but affects a minimum portion of the tube. While a 100 percent clad penetration could be achieved by permitting the weld nugget to extend slightly more than 1 times the thickness T down the tube, it is necessary to go to 1½ times the thickness to insure that variations which occur during welding will not result in areas where the clad penetration is not 100 percent at the seam.

The following table gives examples of the parameters used in welding fuel rods. The cladding and end plugs were made of Zircalloy. The electrode used was a 2 percent thoriated tungsten 3/32 inch in diameter ground to a 0.030 inch tip. Two 1¼ ± 1/16 revolution weld passes were made. The arc decay tapered from weld current to zero amperes is ½ ± 1/16 revolution for the blanket and reflector and is 1 ± 1/16 revolution for the seed.

|  | Seed | PF Blanket | Std. Blanket | Reflector |
| --- | --- | --- | --- | --- |
| Speed of Rotation RPM | 7 ± 3% | 4 ± 5% | 4 ± 5% | 3 ± 5% |
| Weld Time Sec./1¼ Rev. | 10.7 ± .3 | 18.8 ± .7 | 18.8 ± .7 | 25.0 ± 1.0 |
| Arc Decay Sec. | 8.6 ± .3 | 7.5 ± .7 | 7.5 ± .7 | 10. ± 1.0 |
| Welding Current Amps. | 43 ± 2 | 60 ± 2 | 60 ± 2 | 85 ± 3 |
| Tube Diam. Inches | 0.310 | 0.529 | 0.576 | 0.835 |
| Wall Thickness Inches | 0.023 | 0.028 | 0.032 | 0.040 |
| Chill to Joint Inches | 0.060 ± .005 | 0.060 ± .005 | 0.060 ± .005 | 0.100 ± .005 |
| Chill to Electrode Inches | 0.090 ± .005 | 0.110 ± .005 | 0.110 ± .005 | 0.150 ± .005 |

The embodiments of the invention in which an exclusive property or priviledge is claimed are defined as follows:

1. A method for butt-welding a relatively low-mass thin-wall tube to a relatively heavy-mass end block inserted in the tube, including the steps of:
   a. positioning a welding electrode in a fixed relationship with the seam between said end block and said tube with said electrode being displaced from said seam toward said end block a distance within the range of ¾ to 2¼ times the wall thickness of said tube,
   b. providing a chill block which completely surrounds said tube and which is in close contact therewith with said chill block being displaced from said seam away from said end block a distance within the range of 1.7 to 2.9 times the wall thickness of said tube, and
   c. supplying a welding current to said electrode of a magnitude so that the top surface of the weld nugget extends down the tube substantially 1½ times the wall thickness of said tube.

2. The welding method of claim 1 further including the steps of:
   a. moving said tube and end block and said electrode relative to each other so that said weld nugget is extended circumferentially around said tube and end block to weld completely said seam, and
   b. establishing the speed of said relative movement and the magnitude of said welding current so that said top surface of said weld nugget extends down said tube substantially 1½ times the wall thickness of said tube.

3. The welding method of claim 2 wherein said relative movement is carried out by rotating said tube and said end block and by holding said electrode in a fixed position.

4. The welding method of claim 3 wherein said welding is carried out in a sealed enclosure filled with an inert gas.

* * * * *